(12) United States Patent
Lenk

(10) Patent No.: US 8,198,819 B2
(45) Date of Patent: Jun. 12, 2012

(54) 3-WAY LED BULB

(75) Inventor: Ronald J. Lenk, Woodstock, GA (US)

(73) Assignee: Switch Bulb Company, Inc., San Jose, CA (US)

( * ) Notice: Subject to any disclaimer, the term of this patent is extended or adjusted under 35 U.S.C. 154(b) by 436 days.

(21) Appl. No.: 12/561,514

(22) Filed: Sep. 17, 2009

(65) Prior Publication Data

US 2010/0090609 A1  Apr. 15, 2010

Related U.S. Application Data

(60) Provisional application No. 61/097,680, filed on Sep. 17, 2008.

(51) Int. Cl.
*H05B 37/00* (2006.01)
*H05B 37/02* (2006.01)

(52) U.S. Cl. ............... 315/201; 315/205; 315/185 R

(58) Field of Classification Search .................. 315/201, 315/205, 193, 185 R, 187, 306, 307, 317, 315/228
See application file for complete search history.

(56) References Cited

U.S. PATENT DOCUMENTS

| | | | |
|---|---|---|---|
| 5,126,634 A | 6/1992 | Johnson | |
| 5,274,611 A | 12/1993 | Donohoe | |
| 5,296,783 A | 3/1994 | Fischer | |
| 5,835,361 A | 11/1998 | Fitzgerald | |
| 6,094,362 A | 7/2000 | Domingo | |
| 6,362,573 B1 | 3/2002 | Helbing et al. | |
| 6,456,015 B1 | 9/2002 | Lovell et al. | |
| 6,717,374 B2 | 4/2004 | Krummel | |
| 7,276,861 B1 | 10/2007 | Shteynberg et al. | |
| 7,358,679 B2 | 4/2008 | Lys et al. | |
| 7,863,831 B2* | 1/2011 | Vos | 315/291 |
| 7,986,107 B2 | 7/2011 | Weaver et al. | |
| 2006/0244396 A1 | 11/2006 | Bucur | |
| 2007/0040696 A1 | 2/2007 | Mubaslat et al. | |
| 2007/0120507 A1 | 5/2007 | Uchida et al. | |
| 2007/0228999 A1 | 10/2007 | Kit | |
| 2008/0013324 A1 | 1/2008 | Yu | |
| 2008/0024070 A1 | 1/2008 | Catalano et al. | |
| 2008/0198615 A1 | 8/2008 | Klipstein | |
| 2010/0109557 A1 | 5/2010 | Bouchard | |
| 2010/0308739 A1* | 12/2010 | Shteynberg et al. | 315/193 |
| 2011/0084615 A1 | 4/2011 | Welten | |
| 2011/0163680 A1 | 7/2011 | Welten | |
| 2011/0248644 A1 | 10/2011 | Welten et al. | |

OTHER PUBLICATIONS

International Preliminary Report on Patentability received for PCT Patent Application No. PCT/US2009/004661, mailed on Mar. 3, 2011, 6 pages.
International Preliminary Report on Patentability received for PCT Patent Application No. PCT/US2009/004663, mailed on Mar. 3, 2011, 6 pages.
International Preliminary Report on Patentability received for PCT Patent Application No. PCT/US2009/005021, mailed on Mar. 24, 2011, 5 pages.

(Continued)

*Primary Examiner* — Daniel D Chang
(74) *Attorney, Agent, or Firm* — Morrison & Foerster LLP

(57) ABSTRACT

Circuits to make a 3-way LED light bulb correctly interface to a standard 3-way light socket, producing three levels of light corresponding to the three settings of the socket. One of the circuits prevents color shift due to varying LED current.

8 Claims, 2 Drawing Sheets

OTHER PUBLICATIONS

International Preliminary Report on Patentability received for PCT Patent Application No. PCT/US2009/005022, mailed on Mar. 24, 2011, 6 pages.

International Search Report received for PCT Patent Application No. PCT/US2009/004661, mailed on Oct. 2, 2009, 2 pages.

International Search Report received for PCT Patent Application No. PCT/US2009/004663, mailed on Sep. 22, 2009, 2 pages.

International Search Report received for PCT Patent Application No. PCT/US2009/005021, mailed on Oct. 16, 2009, 2 pages.

International Search Report received for PCT Patent Application No. PCT/US2009/005022, mailed on Nov. 2, 2009, 2 pages.

Non Final Office Action received for U.S. Appl. No. 12/625,486, mailed on Nov. 14, 2011, 16 pages.

* cited by examiner

3-WAY LED BULB

CROSS-REFERENCE TO RELATED APPLICATION

This application claims priority to U.S. Provisional Patent Application No. 61/097,680, filed Sep. 17, 2008, which is incorporated herein by this reference in its entirety.

FIELD OF THE INVENTION

The present invention relates to circuitry for a 3-way LED light bulb, and more particularly, to a circuit that interfaces with a standard 3-way light socket, and produces three levels of light corresponding to the three settings of the socket.

BACKGROUND OF THE INVENTION

An LED (light-emitting diode) consists of a semiconductor junction, which emits light due to a current flowing through the junction. An LED light bulb is a device that contains one or more LEDs and potentially a drive circuit for the LEDs, which are both located inside a conventionally shaped container (or shell). Conventional LED light bulbs screw into a standard socket and receive AC power from the two power connections of the socket.

However, 3-way sockets differ from standard sockets in that they have three power connections. The control of the socket is configured so that, in sequence, a first power configuration (i.e., a first pair) consisting of the base and one of the power connections, which is energized with AC power, a second power configuration (i.e., a second pair) consisting of the base and a second power connection which is energized, and a third power configuration, which includes the base and both connections (i.e., the first and the second power connections), which are energized. A conventional LED light bulb will be energized only in one of the configurations, and will not respond with different light levels to the different settings.

It can be appreciated that one solution to this problem is to have separate driving circuits energized by each of the configurations (or pairs). It can be appreciated that the circuits can be designed to deliver different drive power to the LEDs, and to deliver the sum of these two drive powers when both are energized. However, in practice, this solution may be expensive, and very difficult to fit inside the bulb.

SUMMARY OF THE INVENTION

This invention has the object of developing a circuit for an LED light bulb such that the above-described primary problem is effectively solved by providing an inexpensive circuit that drives the LEDs in the bulb at different power levels depending on the energization of the 3-way socket. In accordance with an exemplary embodiment, the invention includes at least two (or a pair of) rectifier bridges attached to a pair of AC input connections, either of which may power an AC/DC converter. Each pair of inputs also includes a set (or pair) of low-power bridges. In accordance with an exemplary embodiment, the low-power bridges can be used to detect which of the pairs of AC connections are powered. In accordance with an embodiment, detection is accomplished, for example, by a resistor and a capacitor acting as an integrator. If the first pair of AC connections is powered, the first detector signals the AC/DC converter to produce a first level of power into the LEDs. Similarly, if the second pair of AC connections is powered, the second detector signals the AC/DC converter to produce a second level of power into the LEDs. Finally, if both pairs of AC connections are powered, both detectors signal the AC/DC converter, causing it to produce the sum of the two power levels into the LEDs.

In an alternative circuit, if the first pair of AC connections is powered, the first detector signals the AC/DC converter to produce current into a first string of LEDs. Similarly, if the second pair of AC connections is powered, the second detector signals the AC/DC converter to produce current into a second string of LEDs. Finally, if both pairs of AC connections are powered, both detectors signal the AC/DC converter, causing it to produce current into both strings (i.e., a plurality of LEDs in series) of LEDs. In accordance with an exemplary embodiment, this configuration can be desirable to avoid slight changes in color (or color spectrum) of the LEDs caused by running the LEDs at different currents.

In accordance with an exemplary embodiment, the time constant of the integrator must be set appropriately for both circuits. In particular, the time constant of the integrator must be substantially longer than half a line cycle of the AC power. In a preferred embodiment, the time constant of the integrator is approximately 5 to 10 times as long as half a line cycle of the AC power.

BRIEF DESCRIPTION OF THE DRAWINGS

The accompanying drawings are included to provide a further understanding of the invention, and are incorporated in and constitute a part of this specification. The drawings illustrate an embodiment of the invention and, together with the description, serve to explain the principles of the invention.

DESCRIPTION OF THE PREFERRED EMBODIMENT

Figure 1:
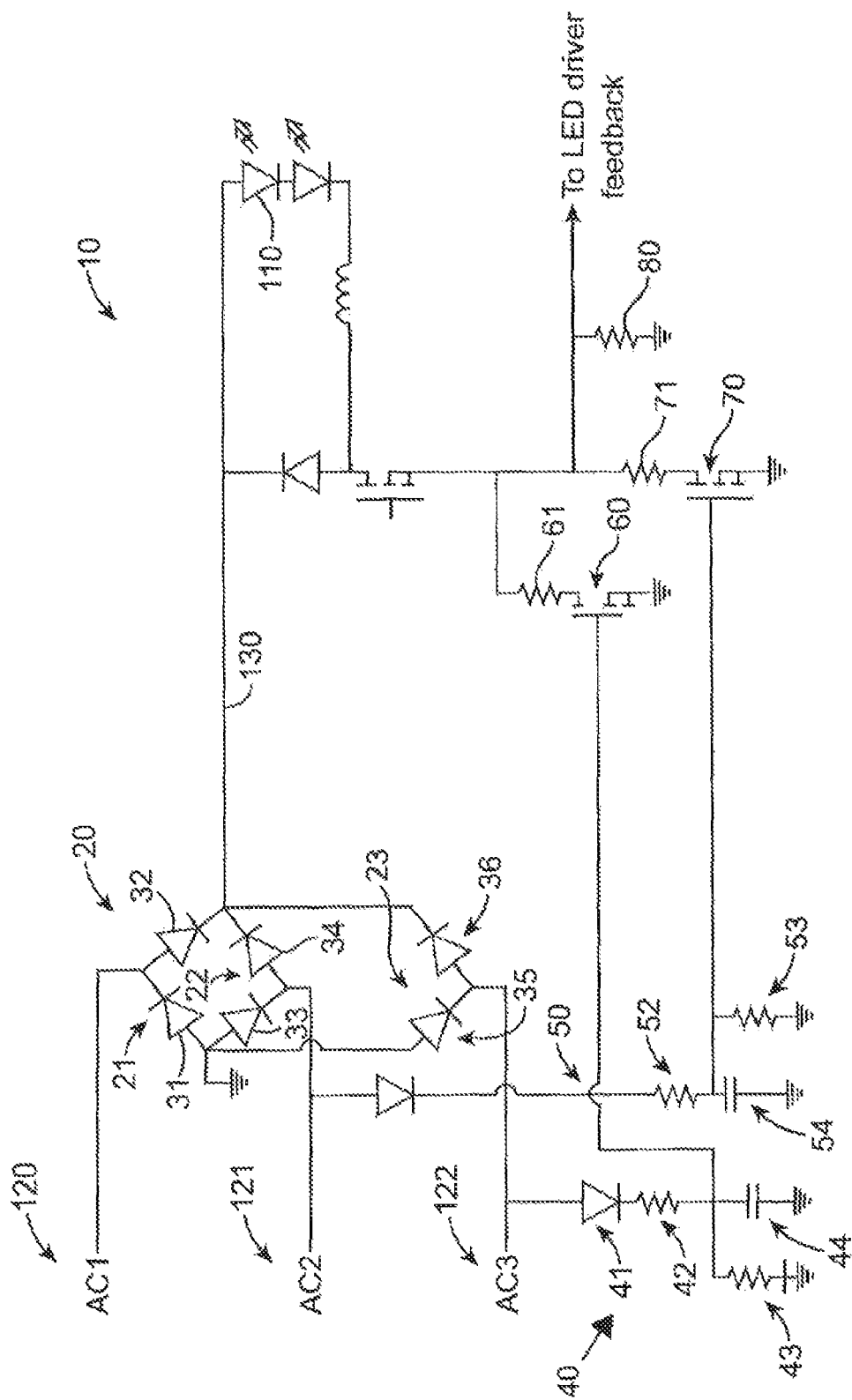
FIG. 1 is a circuit schematic of a circuit that drives the LEDs in an LED bulb at different power levels depending on the energization of a 3-way socket.

Reference will now be made in detail to the present preferred embodiments of the invention, an example of which is illustrated in the accompanying drawing. Wherever possible, the same reference numbers are used in the drawing and the description to refer to the same or like parts.

According to the design characteristics, a detailed description of the preferred embodiments is given below.

FIG. 1 is a schematic of a circuit 10 that drives at least one string of LEDs 110 (i.e., a plurality of LEDs 110 in series) in an LED bulb at different power levels depending on the energization of a 3-way socket (not shown). In accordance with a preferred embodiment, the circuit 10 includes a base 120 and a first ring 121 of the socket, which are connected to an AC power bridge (or bridge rectifier) 20. The AC power bridge 20 is preferably a standard AC power bridge, which includes a first half 21 consisting of a first pair of diodes 31, 32, and a second half 22 consisting of a second pair of diodes 33, 34. In accordance with an exemplary embodiment the first and second pairs of diodes 31, 32, 33, 34 (i.e., the four (4) diodes) are configured in a standard full-wave rectification configuration. The output and ground of the bridge 20 are connected to a power system 130, which drives the at least one LED 110.

In a preferred embodiment, the circuit 10 also includes a second ring 122 of the socket, which is connected to a bridge rectifier circuit 23, which consists of a third pair (i.e., two) of diodes 35, 36. In accordance with an exemplary embodiment, the second half 22 of the bridge rectifier 20 is the same as the first half 21 of the first bridge rectifier 20. In operation, current being drawn from the second ring 122 is rectified by the first and third pairs of diodes 31, 32, 35, 36, which acts as a complete bridge rectifier. The output of this bridge rectifier is used to power the power system 130, in parallel with the output of the bridge rectifier 20.

In accordance with an exemplary embodiment, in order to determine which light level is desired, the first and second rings 121, 122 each have an independent detection circuit 40, 50 (i.e., a first detection circuit 40, and a second detection circuit 50). In the first detection circuit 40, an input connection in the form of AC power (AC3) from the second ring 122 is half-wave rectified by diode 41. This signal is integrated by an RC circuit consisting of a resistor 42 and a capacitor 44. When AC power (AC3) from the second ring 122 is energized, the voltage on the capacitor 44 rises to a level set approximately by the values of the resistor dividers 42, 43. When AC power (AC3) from the second ring 122 is not energized, the voltage on capacitor 44 falls to zero, as energy is bled out through the resistor 43. The voltage on the capacitor 44 is thus indicative of the presence or absence of energization of AC power (AC3) on the second ring 122. In accordance with an exemplary embodiment, the functionality and structure of the second detection circuit 50 for energization detection of an input or input connection in the form of AC power (AC2) on the first ring 121 is essentially identical to the first detection circuit 40.

In accordance with an exemplary embodiment, the voltage present on capacitors 44, 54 is used to determine the on or off state of transistors 60, 70. The transistors 60, 70 are used in turn to determine the value of the current sense resistor used in a power switcher 130, which sets the power level. In particular, if the AC power (AC2) in the first ring 121 is energized, capacitor 54 will have a voltage on it. By suitable selection of resistors 52 and 53, this voltage can be designed to be high enough to turn on transistor 70. When transistor 70 is on, resistor 71 in series with transistor 70 is used as a current sensor by the power switching circuit 130. The current sensor (resistor 71 in series with transistor 70) is used by the power switcher 130 to set the amount of current that flows through the at least one LED 110. If AC power (AC2) in the first ring 121 is not energized, the voltage on capacitor 54 will be zero, transistor 70 will be off, and the power switcher 130 will use the default resistor 80 to set the LED current.

In the similar case wherein the AC power (AC3) in the second ring 122 is energized, transistor 60 is turned on, and resistor 61 in series with transistor 60 is used as a current sensor by the power switching circuit 130. If both AC power (AC2) and (AC3) from the first and second rings 121, 122 are energized, both capacitors 44 and 54 will be charged, both transistors 60 and 70 will be on, and the two current sense resistors 61 and 71 in series with their respective transistors 60 and 70 will be used as current sensors.

Thus in this circuit 10, three different light levels are available by suitably selecting the values of current sense resistors 61 and 71. When AC power (AC2) from the first ring 121 is energized, the current generated by the power switcher 130 will be set by resistor 71. When AC power (AC3) is energized, the current generated by power switcher 130 will be set by resistor 61. When both the AC power (AC2), (AC3) from the first and second rings 121, 122 are energized, the current generated by power switcher 130 will be set by the parallel combination of resistors 61, 71. In accordance with an exemplary embodiment, resistor 80 is preferentially selected to set a very low current through the at least one LED 110, so that during the time it takes for the capacitors 44 and/or 54 to charge, no destructive switching occurs in the power switcher 130.

Figure 2:
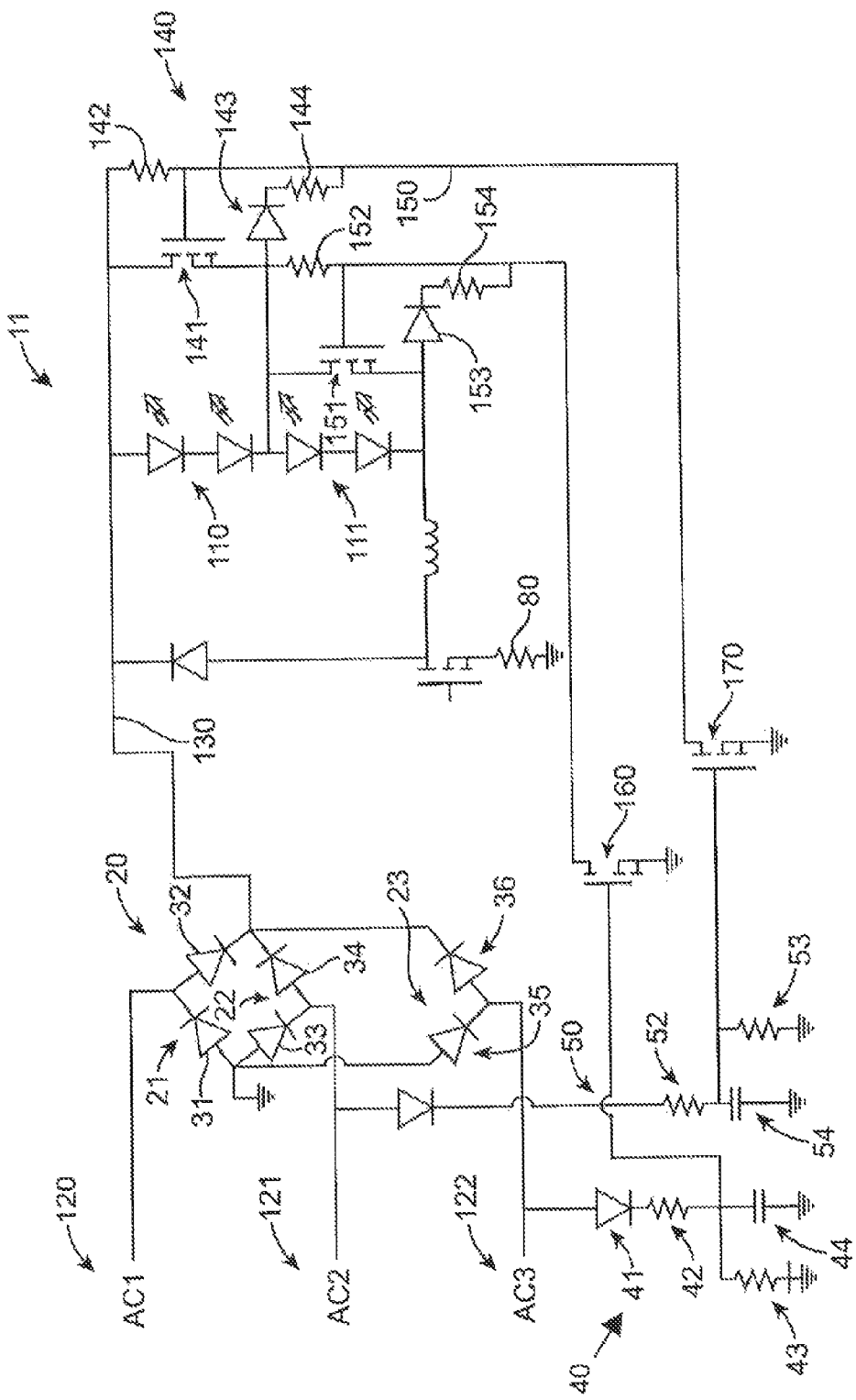
FIG. 2 is a circuit schematic of a circuit that selectively drives the LEDs in an LED bulb depending on the energization of a 3-way socket.

FIG. 2 is a schematic of a circuit 11 that drives at least two series or strings of LEDs 110, 111 (i.e., a first series and a second series of LEDs 110, 111) in an LED bulb with differing LEDs on or off depending on the energization of a 3-way socket. In accordance with an exemplary embodiment, each of the at least two strings of LEDs 110, 111 includes at least one LED 110, 111. It can be appreciated that in accordance with an exemplary embodiment, each of the at least two strings of LEDs 110, 111 are comprised of a single LED 110, 111. In accordance with a preferred embodiment, the base 120 and the first ring 121 of the socket are connected to an AC power bridge 20 (i.e., a standard AC power bridge or bridge rectifier), consisting of two halves 21, 22 (i.e., a first half 21 and a second half 22). The first half 21 consists of a first pair (i.e., two) diodes 31, 32, and the second half 22 consists of a second pair (i.e., two) of diodes 33, 34. The four diodes 31, 32, 33, 34 (i.e., the first and second pair of diodes) being configured in a standard full-wave rectification configuration. In accordance with an exemplary embodiment, the output and ground of the bridge 20 are connected to the power system 130, which drives the at least one two strings of LEDs 110 and 111.

In this preferred embodiment, the second ring 122 of the socket is connected to a bridge rectifier circuit 23, which consists of a third pair (i.e., two) diodes 35, 36. In accordance with an exemplary embodiment, the second half 22 of the bridge rectifier 20 is the same as the first half 21 of the first bridge rectifier 20. In operation, current being drawn from the second ring 122 is rectified by the first and third pair of diodes 31, 32, 35, 36, which act as a complete bridge rectifier. The output from the bridge rectifier is used to power the power system 130, in parallel with the output of the bridge rectifier 20.

In order to determine which light level is desired, the two rings 121, 122 have independent detection circuits 40, 50 (i.e., a first detection circuit and a second detection circuit). In the first detection circuit 40, the AC power (AC3) from second ring 122 is half-wave rectified by diode 41. The signal from diode 41 is integrated by an RC circuit consisting of a resistor 42 and a capacitor 44. When the AC power (AC3) from the second ring 122 is energized, the voltage on the capacitor 44 rises to a level set approximately by the values of the resistor divider, which is comprised of resistors 42, 43. When the AC power (AC3) from the second ring 122 is not energized, the voltage on the capacitor 44 falls to zero, as energy is bled out through the resistor 43. The voltage on the capacitor 44 is thus indicative of the presence or absence of energization of AC power (AC3) on the second ring 122. The second detection circuit 50 works identically for energization detection of the AC power (AC2) on the first ring 121.

The voltage present on the capacitors 44, 54 is used to determine the on or off state of transistors 160, 170, respectively. The transistors 160, 170 are used in turn to determine which of the string or series of LEDs 110, 111 are shunted, setting the light level of the bulb. In particular, if the AC power (AC2) in the first ring 121 is energized, capacitor 54 will have a voltage on it. By suitable selection of resistors 52, 53, the voltage can be designed to be high enough to turn on transistor 170. When transistor 170 is on, shunting circuit 140 is off, permitting current to flow through the first series of LEDs 110. When transistor 170 is off, shunting circuit 140 is on, which shunts current around the first series of LEDs 110, keeping the first series of LEDs 110 in an unlit state or condition.

In accordance with an exemplary embodiment, the circuit 11 also includes a first shunting circuit 140, which consists of a transistor 141, resistors 142, 144 and a diode 143. When transistor 170 is off, the gate voltage on the transistor 141 is pulled up to its drain voltage by resistor 142. If the voltage across the gate to source of transistor 141 exceeds the rating of the transistor, the gate to source voltage can be clamped by a zener diode (not shown). When transistor 170 is on, the gate voltage on transistor 141 is pulled down. In accordance with an exemplary embodiment, the diode 143 and the resistor 144 limit how negative the gate to source voltage of transistor 141 can go, which avoids exceeding the rating of transistor 141.

In the similar case wherein the AC power (AC3) in the second ring 122 is energized, transistor 160 is turned on, and a second shunting circuit 150 is de-activated, permitting current to flow through second series LEDs 111. The second shunting circuit 150 consists of a transistor 151, resistors 152, 154 and a diode 153. If both AC power (AC2), (AC3) in the first and second rings 121, 122 are energized, both the capacitors 44, 54 will be charged, both the transistors 160, 170 will be on, and both the shunt circuits 140, 150 will be de-activated, permitting current to flow through both the first series or string of LEDs 110 and the second series or string of LEDs 111.

Thus in this circuit, three different light levels are available by suitably selecting which of the shunt units or shunt circuits 140, 150 are de-activated. When AC power (AC2) in the first ring 121 is energized, the current generated by the power switcher 130 flows through the first series or string of LEDs 110. When AC power (AC3) in the second ring 122 is energized, the current generated by the power switcher 130 flows through the second series or string of LEDs 111. When AC power (AC2), (AC3) in both the first and second rings 121, 122 are energized, the current generated by power switcher 130 flows through both the first and second series or strings of LEDs 110, 111.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A circuit for driving an LED light bulb at varying levels of brightness depending on the energization of a 3-way socket comprising:
    a pair of inputs, each input having a rectifier bridge associated therewith and producing parallel outputs;
    at least one LED;
    a power system for the at least one LED, which runs from the parallel outputs of the rectifier bridges;
    an energization detector circuit for each pair of inputs; and
    a selection circuit that selects a current feedback for the power system, and
    wherein the feedback is dependant on an output of the energization detector circuits.

2. A circuit for driving an LED light bulb at varying levels of brightness depending on the energization of a 3-way socket as set forth in claim 1, wherein said energization detector circuit consists of a half wave rectifier, a resistor divider and a capacitive filter.

3. A circuit for driving an LED light bulb at varying levels of brightness depending on the energization of a 3-way socket as set forth in claim 1, wherein the selection circuit consists of a pair of gain-setting circuits for each pair of inputs.

4. A circuit for driving an LED light bulb at varying levels of brightness depending on the energization of a 3-way socket as set forth in claim 3, wherein each of the pair of gain-setting circuits consist of a transistor in series with a current-sense resistor.

5. A circuit for driving an LED light bulb at varying levels of brightness depending on the energization of a 3-way socket comprising:
    a pair of inputs, each input having a rectifier bridge associated therewith and producing parallel outputs;
    at least two strings of LEDs, each consisting of at least one LED;
    a power system for the at least two strings of LEDs, which runs from the parallel outputs of the rectifier bridges;
    an energization detector circuit for each pair of inputs;
    a selection circuit that selectively shunts one or more of the at least two strings of LEDs dependant on an output of the energization detector circuits; and
    wherein the selection circuit consists of a pair of shunt circuits for each input.

6. A circuit for driving an LED light bulb at varying levels of brightness depending on the energization of a 3-way socket as set forth in claim 5, wherein the shunt circuits consist of a transistor.

7. A circuit for driving an LED light bulb at varying levels of brightness depending on the energization of a 3-way socket as set forth in claim 5, wherein the shunt circuits consist of a transistor along with a gate protection circuitry.

8. A circuit for driving an LED light bulb at varying levels of brightness depending on the energization of a 3-way socket comprising:
    a pair of inputs, each input having a rectifier bridge associated therewith and producing parallel outputs;
    at least two strings of LEDs, each consisting of at least one LED;
    a power system for the at least two strings of LEDs, which runs from the parallel outputs of the rectifier bridges;
    an energization detector circuit for each pair of inputs;
    a selection circuit that selectively shunts one or more of the at least two strings of LEDs dependant on an output of the energization detector circuits; and
    wherein each of the energization detector circuits consist of a half wave rectifier, a resistor divider and a capacitive filter.

* * * * *